United States Patent [19]

Bisberg

[11] 3,709,590
[45] Jan. 9, 1973

[54] FOLDER FOR OVERHEAD PROJECTOR

[76] Inventor: Aaron M. Bisberg, P.O. Box 14 North Station, White Plains, N.Y. 10603

[22] Filed: Sept. 14, 1970

[21] Appl. No.: 72,064

[52] U.S. Cl..................................353/120, 353/35
[51] Int. Cl...............................................G03b 21/00
[58] Field of Search ..............353/120, 35; 40/106.1

[56] References Cited

UNITED STATES PATENTS 3,524,703   8/1970   Wright ..................................353/35
3,544,211   12/1970  Albee ..................................353/120

*Primary Examiner*—William D. Martin, Jr.
*Attorney*—Burgess, Dinklage & Sprung

[57] ABSTRACT

A three leaf folder for use on an overhead projector, with each leaf consecutively hinged. Two leaves of the folder are constructed with an indexing system for positioning the folder on a coupling member that predetermines the proper relationship between the projector and transparencies to be viewed and one transparency to another. While projection and manipulation occur, the third leaf provides an exposed surface upon which instructional material is provided.

5 Claims, 3 Drawing Figures

PATENTED JAN 9 1973

3,709,590

INVENTOR.
AARON M. BISBERG
BY
Burgess, Dinklage & Sprung

FOLDER FOR OVERHEAD PROJECTOR

The invention relates to a folder for the storage and projection of transparencies on an overhead projector.

Overhead projectors are used widely for presentations of educational and commercial material using a transparent stage on which projectable images are positioned. Indexing means are sometimes provided to ensure proper positioning of the projectable image relative to the stage.

With more complex presentations involving multiple images and/or textual material to which the operator wishes to refer while projecting the images, it is sometimes found that the images are not in proper sequence or some have been misplaced. Attempts have been made to solve this by use of binders in which the projectable images and textual matter are bound. While these binders constituted an improvement over a loose assemblage of independent pages, they did not always permit the operator to see the textual matter simultaneously with the projection of the images. Moreover, excessive manipulation of the elements was necessary to prepare the binder for use by the operator.

It is accordingly an object of the invention to provide a simple folder for storing, projecting and viewing multiple and/or composite images while simultaneously maintaining textual matter in position for reference by the operator.

This and other objects and advantages are realized in accordance with the present invention wherein there is provided a folder comprising three consecutively hinged leaves. Two leaves of the folder are constructed with an indexing system for positioning the folder on a coupling member that predetermines the proper relationship between the projector and transparencies to be viewed and one transparency to another. The multiple transparencies together constitute the first leaf.

The invention will be described more fully with reference to the accompanying drawings, wherein.

Figure 1:
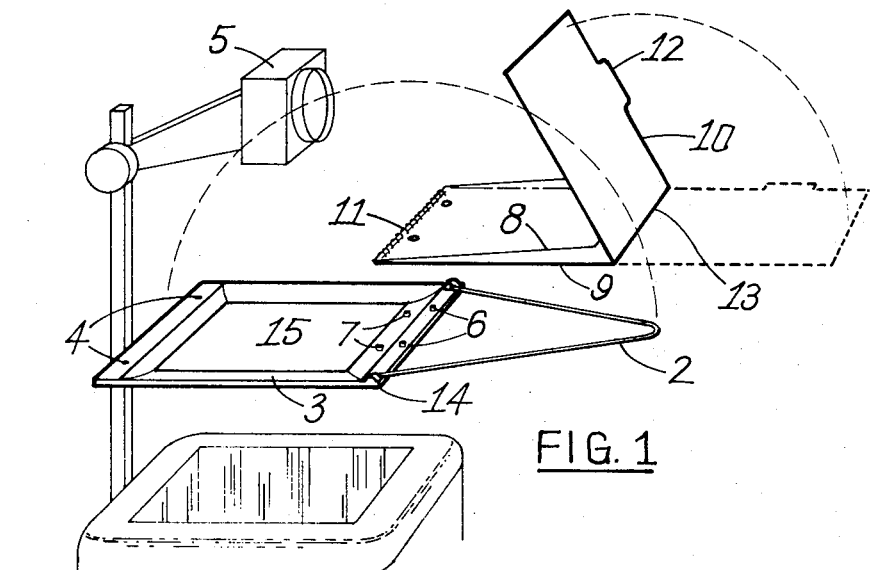
FIG. 1 is an exploded perspective view showing the relation of an overhead projector to the novel folder with an intermediary coupler.

Referring now more particularly to FIG. 1, there are shown transparencies or overlays 8, also known as the first leaf, which carry images for presentation and teaching on the overhead projector 1; these transparencies 8, considered the first leaf, are bound into a file folder-like device 13 of any suitable material. When the transparencies 8 are not projecting, both the back cover 9, the second leaf, and front cover 10, the third leaf, act to protect the transparencies 8. The transparencies 8 and folder 13, comprising covers 9 and 10, are bound to one another at edge 11 by any means suitable to freely permit the transparencies to turn out approximately 180° for projection, and beyond, to return to the underside of the back cover for separate projection of other transparencies. The folder 13 may be tabbed 12 to expedite storage and retrieval.

The folder 13 element is placed in working relationship to the overhead projector through a coupler 14 consisting of a coupler frame 3, a device for rigid connection to the projector such as suction cups 4 or any other grasping device, and a folder support 2. The coupler 14 incorporates an indexing system including a pair of pins 6 for registry with corresponding holes in the first and second leaves to locate and hold the folder in such a manner as to permit the transparencies when projected to properly seat on an additional pair of pins 7 thereby controlling the proper registry of multiple image projection. The aperture 15 may be an opening in the coupler 14 or be closed by any transparent material permitting the transmission of light.

Figure 2:
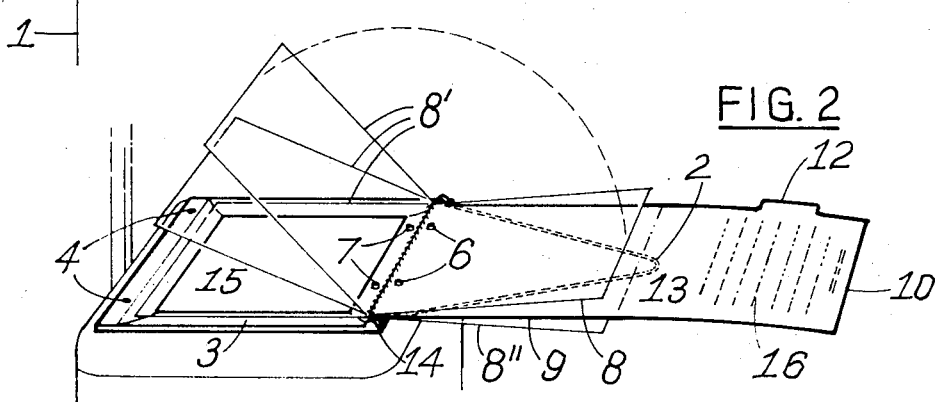
FIG. 2 is a perspective view showing the components of FIG. 1 in operative position.
Figure 3:
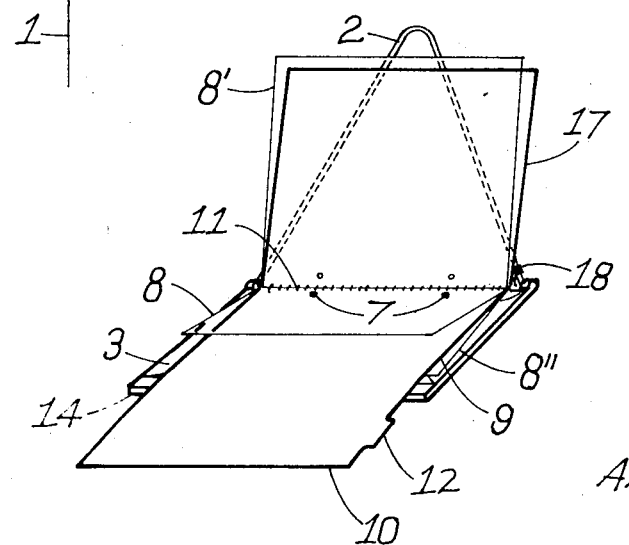
FIG. 3 is a perspective view of the folder of FIG. 1 arranged for non-projection presentation and individual study.

Referring now to FIG. 2, the folder 13 is positioned on the coupler 14 with the holes on folder 13 in registry with pins 6 and with edge 11 positioned between pins 6 and 7. The coupler 14 is in turn related to the projector 1 with the first leaf 8' now positioned over aperture 15. The supporting member 2 is placed in an approximately 180° position to support the second and third leaves. Multiple transparencies 8' can be projected by folding two or more transparencies 8' onto aperture 15.

To displace transparencies 8' by other transparencies 8, the folder 13 is removed from the coupler 14 and the transparencies are folded under second leaf 9. The folder 13 is then replaced on coupler 14 and first leaf 8 can be folded onto aperture 15 for projection.

The exposed surface of third leaf 10 carries unencumbered instructional and procedural notes 16, and is supported in position by supporting member 2 which extends beyond the second leaf 9.

In this manner, one or more transparencies overlay the aperture 15 so as to projected, other transparencies are held on the second leaf ready for overlay and the textual matter is visible to the operator, the second and third leaves being supported in open position by the elongated support member.

The folder is also suited for use without a projector, as a desk-top study aid or presentation. In such use, the coupler 14 is placed on a flat surface, such as a desk or table, with folder support frame 2 in obtuse angle position. Support frame 2 is kept in easel position by easel position lock 18. The folder 13 position is reversed from its projection position and is now placed with the second leaf over aperture 15, and with third leaf 10 opened away from supporting member. A reflecting board 17 which may be hinged at 11, or be a separate unit, or be an integral part of the support member 2, is located in the obtuse angle position. Transparencies 8' are then folded onto the reflecting board as desired.

Multiple images can be utilized by the simultaneous use of two or more transparencies 8' on the reflecting board 17. Displacement of transparencies 8' is accomplished by lifting the folder 13 from coupler 14 and turning transparency 8' under second leaf 9 into position 8''. With folder 13 replaced, transparencies 8 can be moved into position 8'.

While the drawings show a wire-type hinge for edge 11, a fabric-type taped hinge or a loose-leaf hinge could also be used. The hinge between the second and third leaves can constitute a simple fold in a cardboard backing or can be similar in construction to edge 11.

The indexing means have been shown as two pairs of pins on the coupler and corresponding holes on the folder but other equivalent indexers may be substituted, e.g. a stepped, profiled frame for use with transparencies of precise dimension, or matching notches on coupler and folder.

The support member 2 is shown as a wire loop projecting a distance greater than the depth of one of the leaves of the folder. It could as well be a full sheet of material, e.g. plastic, cardboard, metal, and the like. It can be made to hold in any of at least three positions, i.e. fully closed, fully open and partially open at an obtuse angle by notches, springs, slots, and the like. Alternatively the supporting member may comprise a separable member capable of being joined to the frame in either the partially opened or fully opened position, the joinder being effected by providing the frame with slots into which said member may be slid.

Additional leaves may be added to the third leaf as desired, being made transparent for projection or containing additional textual matter.

It will be appreciated that the instant specification and examples are set forth by way of illustration and not limitation and that various modifications and changes may be made without departing from the spirit and scope of the present invention.

What is claimed is:

1. A folder adapted for use with a coupling member disposed on an overhead projector, said folder comprising first, second, and third consecutively hinged leaves, indexing means on said first and second leaves symetrically disposed relative to the connecting hinge therebetween for positioning said folder relative to said coupling member in predetermined working relationship, at least said first leaf being transparent, at least one transparent overlay hinged at said connecting hinge so as to be displaceable between a position overlaying said first leaf and position overlaying said second leaf, said overlay being provided with indexing means in registry with those of said first and second leaves, and instructional material provided on the exposed face of said third leaf in operating position.

2. A folder according to claim 1 in combination with a coupling member, said coupling member including a frame for positioning on the stage of an overhead projector, said frame being provided with indexing means for registry with said indexing means of said first and second leaves and of said overlay, said coupling member further including a supporting member cooperating therewith so as to be capable of being located in a first position to form an angle of about 180° with said frame and in a second position forming an obtuse angle with said frame.

3. A combination according to claim 2 wherein said supporting member comprises a hinged element and means for fixing it in either of said two positions.

4. A combination according to claim 2 wherein said supporting member comprises a separable member capable of being joined to said frame in either of said two positions.

5. A combination according to claim 2, wherein said supporting member extends from said frame a distance greater than the width of said second leaf thereby also to support said third leaf.

* * * * *